(12) United States Patent
Robinson

(10) Patent No.: US 8,302,922 B1
(45) Date of Patent: Nov. 6, 2012

(54) CAMP LANTERN TREE STAND

(76) Inventor: Kevin Robinson, Cedar City, UT (US)

( * ) Notice: Subject to any disclaimer, the term of this patent is extended or adjusted under 35 U.S.C. 154(b) by 137 days.

(21) Appl. No.: 12/876,274

(22) Filed: Sep. 7, 2010

(51) Int. Cl.
*A47B 96/06* (2006.01)
*A47G 29/00* (2006.01)
*E04G 3/00* (2006.01)
*E04G 5/06* (2006.01)

(52) U.S. Cl. ............ 248/219.4; 248/218.4; 211/107

(58) Field of Classification Search .......... 248/219.4, 248/218.4, 317; 211/107, 85.7
See application file for complete search history.

(56) References Cited

U.S. PATENT DOCUMENTS

| | | | |
|---|---|---|---|
| 3,345,028 A | 10/1967 | Lawrie | |
| 3,746,294 A | 7/1973 | Johnston | |
| 3,785,604 A | 1/1974 | Steck | |
| 4,744,537 A | 5/1988 | Buckley | |
| 5,108,058 A | 4/1992 | White | |
| 5,310,151 A | 5/1994 | Engel | |
| 5,390,884 A | 2/1995 | Skoff et al. | |
| 5,437,377 A | 8/1995 | Reimenschneider | |
| 6,196,511 B1* | 3/2001 | Beauchemin | 248/328 |
| 6,202,964 B1* | 3/2001 | Thornhill | 248/219.4 |
| 6,290,195 B1* | 9/2001 | Deuer | 248/230.8 |
| 6,478,272 B1* | 11/2002 | McKinsey et al. | 248/216.1 |
| 6,991,204 B2 | 1/2006 | Ay | |
| 7,479,149 B2* | 1/2009 | Pallazza | 606/191 |
| 8,016,134 B1* | 9/2011 | Templin et al. | 211/85.7 |
| 2002/0166928 A1* | 11/2002 | Johnson | 248/125.3 |
| 2004/0027823 A1* | 2/2004 | Barjesteh | 362/184 |
| 2005/0246935 A1* | 11/2005 | Northrup | 42/94 |
| 2011/0049315 A1* | 3/2011 | Buckbee | 248/219.4 |

* cited by examiner

*Primary Examiner* — Amy J Sterling
(74) *Attorney, Agent, or Firm* — Kyle Fletcher

(57) ABSTRACT

The camp lantern tree stand includes an adjustable tree strap that encircles the outer periphery of a tree to support said stand thereon. The camp lantern tree stand includes a camp lantern support arm that extends and retracts from the stand to support a camp lantern at a predetermined distance away from said tree while above a ground surface. The camp lantern tree stand also includes a plurality of hooks that may extend and retract to support a plurality of items thereon. The camp lantern tree stand provides a useful way to illuminate an area immediately adjacent a tree while simultaneously supporting a plurality of other items thereon. The camp lantern tree stand uses the adjustable tree strap to hang thereon, which does not require mounting means that damage said tree, and which provides ease in mounting or dismounting the camp lantern tree stand therefrom.

15 Claims, 4 Drawing Sheets

CAMP LANTERN TREE STAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of camping accessories, more specifically, a tree stand that can support a camp lantern in addition to other items typically associated with camping.

B. Discussion of the Prior Art

As will be discussed immediately below, no prior art discloses a camp lantern tree stand specifically suited for hanging a camp lantern thereon via a camp lantern support arm that can extend and retract from behind said device, as well as a plurality of hooks and brackets for supporting a plurality of items associated with camping; wherein an adjustable tree strap encircles an exterior surface of a tree, which does not damage a tree mounted thereon.

The Riemenschneider Patent (U.S. Pat. No. 5,437,377) discloses a tree attachable arrow holder for retaining a plurality of hunting arrows in a tree anchorable rack. However, the holder simply screws into the side of a tree, which can damage the tree by leaving a hole after removal of said device. Also, the holder is directed to supporting a plurality of arrows and does not have an arm that can extend to support a camp lantern at a distance away from a tree, and wherein said arm can retract when not in use.

The Skoff et al. Patent (U.S. Pat. No. 5,390,884) discloses a lantern holder that can be attached to a tree. However, the lantern holder does not teach an arm that can extend and retract from its base.

The Lawrie Patent (U.S. Pat. No. 3,345,028) discloses a suspension device for lanterns. Again, the device does not teach an arm that can fully extend when in use and retract behind its base when not in use.

The White Patent (U.S. Pat. No. 5,108,058) discloses a camping light holder. However, the holder is not adapted for attachign about a tree.

The Johnston Patent (U.S. Pat. No. 3,746,294) discloses a lantern hanger assembly. Again, the assembly uses a generally horizontal support arm that cannot extend and retract behind the base when not in use.

The Ay Patent (U.S. Pat. No. 6,991,204) discloses a recessed hanging apparatus for attachment to a tree trunk. However, the apparatus does not teach an arm that extends and retracts from behind a base, and of which can be used to support a camp lantern at a distance from a tree.

The Engel Patent (U.S. Pat. No. 5,310,151) discloses a lantern hanger that is arranged for mounting about an exterior periphery of an available tree in a camping environment with telescoping tubes projecting from a forward wall of the support housing. Again, the telescoping projecting tubes extend vertically away from said tree, but cannot fold back behind the mounting base when not in use.

The Buckley Patent (U.S. Pat. No. 4,744,537) discloses an improved hanging device for a lantern. However, the device does not teach an arm that extends and retracts from behind a base, and of which can be used to support a camp lantern at a distance from a tree.

The Steck Patent (U.S. Pat. No. 3,785,604) discloses a lantern support bracket for mounting to a tree. Again, the bracket does not teach an arm that extends and retracts from behind a base, and of which can be used to support a camp lantern at a distance from a tree.

While the above-described devices fulfill their respective and particular objects and requirements, they do not describe a camp lantern tree stand specifically suited for hanging a camp lantern thereon via a camp lantern support arm that can extend and retract from behind said device, as well as a plurality of hooks and brackets for supporting a plurality of items associated with camping; wherein an adjustable tree strap encircles an exterior surface of a tree, which does not damage a tree mounted thereon. In this regard, the camp lantern tree stand departs from the conventional concepts and designs of the prior art.

SUMMARY OF THE INVENTION

The camp lantern tree stand includes an adjustable tree strap that encircles the outer periphery of a tree to support said stand thereon. The camp lantern tree stand includes a camp lantern support arm that extends and retracts from the stand to support a camp lantern at a predetermined distance away from said tree while above a ground surface. The camp lantern tree stand also includes a plurality of hooks that may extend and retract to support a plurality of items thereon. The camp lantern tree stand provides a useful way to illuminate an area immediately adjacent a tree while simultaneously supporting a plurality of other items thereon. The camp lantern tree stand uses the adjustable tree strap to hang thereon, which does not require mounting means that damage said tree, and which provides ease in mounting or dismounting the camp lantern tree stand therefrom.

It is an object of the invention to provide a device that attaches to a tree in a non-damaging manner, and upon which a camp lantern can be hung there from at a distance away from said tree such that the likelihood of fire being transmitted to said tree is minimized.

A further object of the invention is to provide a camp lantern support arm that can extend from and retract behind the base of the device.

A further object of the invention is to provide a plurality of hooks that are located on an outer surface of the stand, and are for use in supporting a plurality of items there from.

A further object of the invention is to include some hooks that can fold up when not in use.

These together with additional objects, features and advantages of the camp lantern tree stand will be readily apparent to those of ordinary skill in the art upon reading the following detailed description of presently preferred, but nonetheless illustrative, embodiments of the camp lantern tree stand when taken in conjunction with the accompanying drawings.

In this respect, before explaining the current embodiments of the camp lantern tree stand in detail, it is to be understood that the camp lantern tree stand is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the camp lantern tree stand.

It is therefore important that the claims be regarded as including such equivalent construction insofar as they do not depart from the spirit and scope of the camp lantern tree stand. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2A illustrates an isometric view of the first arm and second arm fully extended and further detailing the interrelation of both parts to illustrate the inability of the second arm to over-rotate with respect to the first arm;

DETAILED DESCRIPTION OF THE EMBODIMENT

Figure 1:
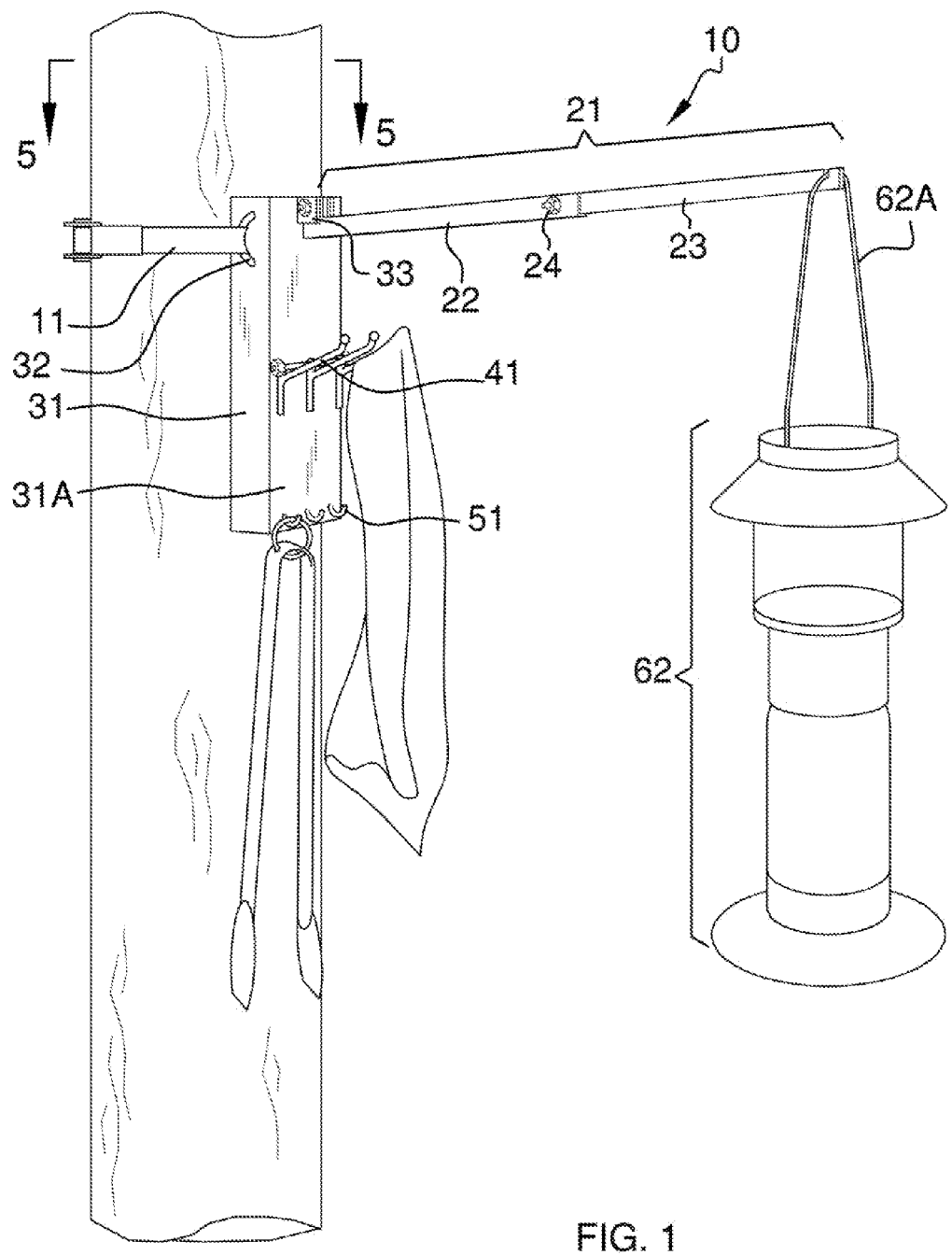
FIG. 1 illustrates a front, isometric view of the camp lantern tree stand installed upon a tree with a camp lantern hanging therefrom, and further detailing the plurality of hooks upon which various items hang upon.
Figure 2:
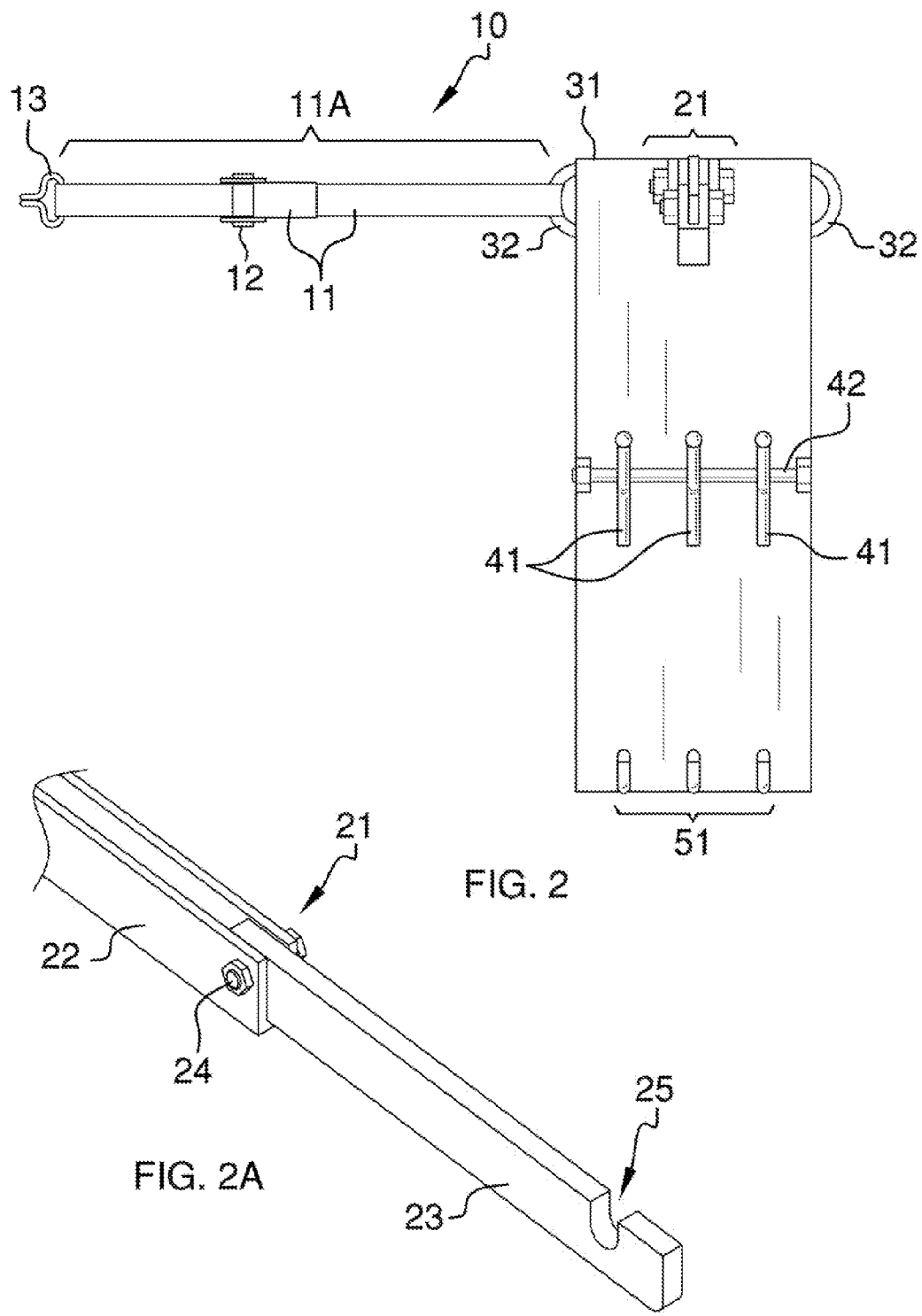
FIG. 2 illustrates a front view of the camp lantern tree stand by itself and detailing the adjustable tree strap that extends around a tree in a straightened orientation.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative", is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A camp lantern tree stand 10 (hereinafter invention) includes an adjustable tree strap 11, a camp lantern support arm 21, a base member 31, a plurality of hooks 41, and a plurality of bottom hooks 51.

The adjustable tree strap 11 includes a ratchet 12 that enables a length 11A to be adjusted in order for the adjustable tree strap 11 to accommodate a tree 61 of varying diameters. The adjustable tree strap 11 must be made of a flexible material that can adapt to differing tree cross-sections that may comprise ovular, circular, or other shapes. A first end of the adjustable tree strap 11 is outfitted with a hook 13; whereas a second end of the adjustable tree strap 11 includes a loop 11B that is attached onto an eyelet 32 located on a side of the base member 31.

Figure 5:
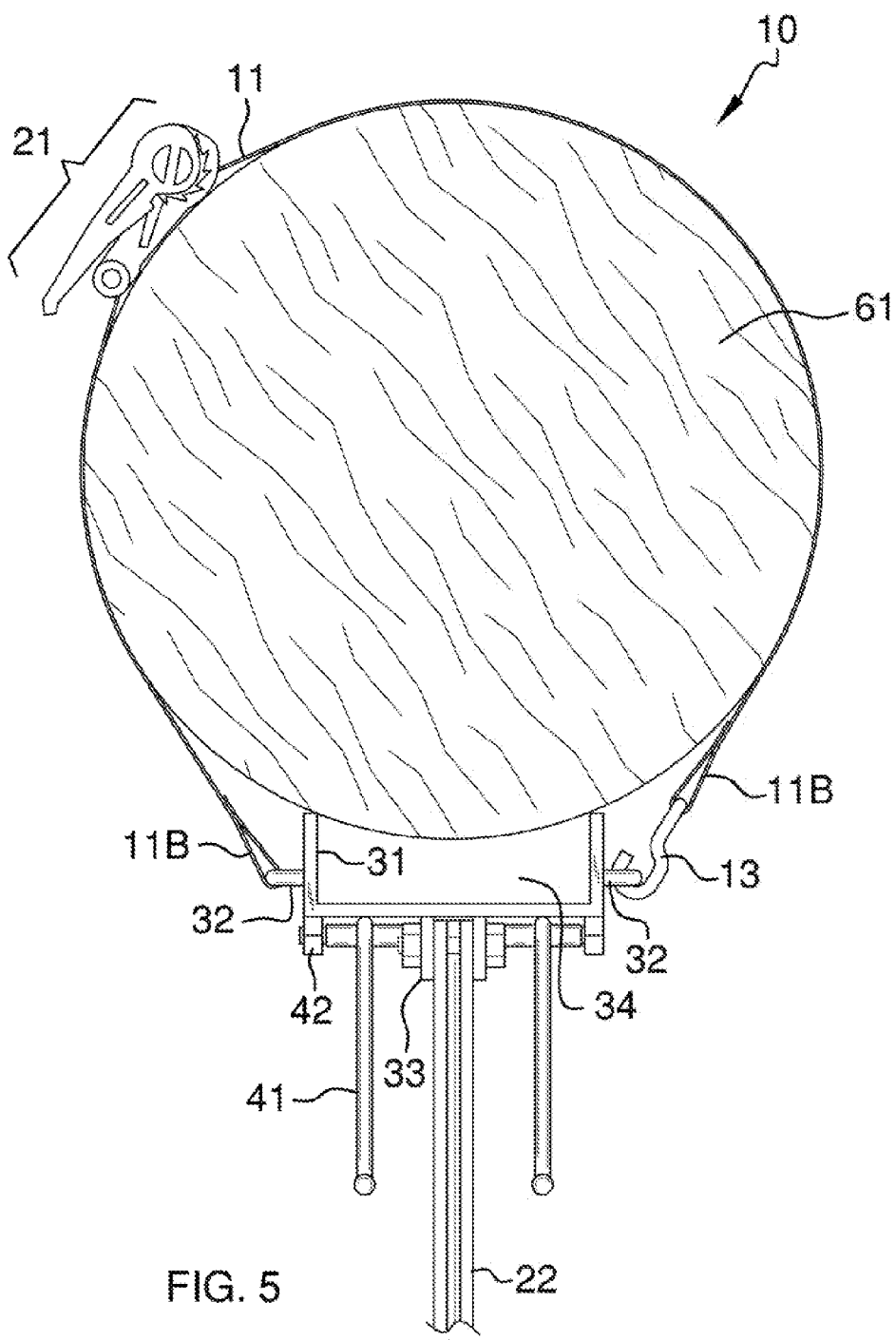
FIG. 5 illustrates a cross-sectional view of the camp lantern tree stand along line 5-5 in FIG. 1 and further detailing the adjustable tree strap extending around an outer periphery of the tree.

It shall be noted that a second eyelet 32 is located on the base member 31 such that the hook 13 can hook onto the second eyelet 32 thereby forming a circle comprised of the adjustable tree strap 11 and the base member 31 (see FIG. 5).

The camp lantern support arm 21 is comprised of a first arm 22 connected to a second arm 23 via a rotating point 24. The first arm 22 connects to the base member 31 via a bracket 33 located on the base member 31. The second arm 23 has a notch 25 upon which a camp lantern 62 rests. The camp lantern 62 usually includes a handle 62A that will engage the notch 25 such that the camp lantern 62 not only is supported by the camp lantern support arm 21, but also the camp lantern 62 will not slide up or down the length of the second arm 23.

Figure 4:
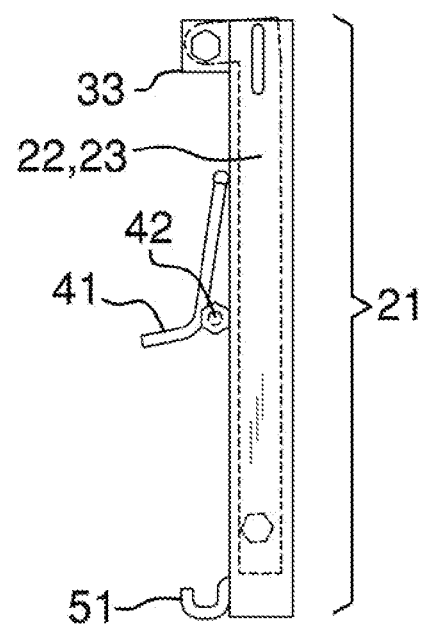
FIG. 4 illustrates a side view of the camp lantern tree stand with the camp lantern support arm in a retracted position and depicted in dashed lines.

The second arm 23 can rotate a total of 180 degrees of rotation with respect to the first arm 22 such that the second arm 23 and the first arm 22 are fully extended (see FIG. 1) or fully retracted (see FIG. 4). The first arm 22 is constructed of a U-shaped channel whereas the second arm 23 is constructed of a single bar that is attached to the first arm 22 via the pivoting point 24. Referring to FIG. 2A, the second arm 23 is stopped from over-rotating with respect to the first arm 22 via the single bar and U-shaped construction.

Figure 3:
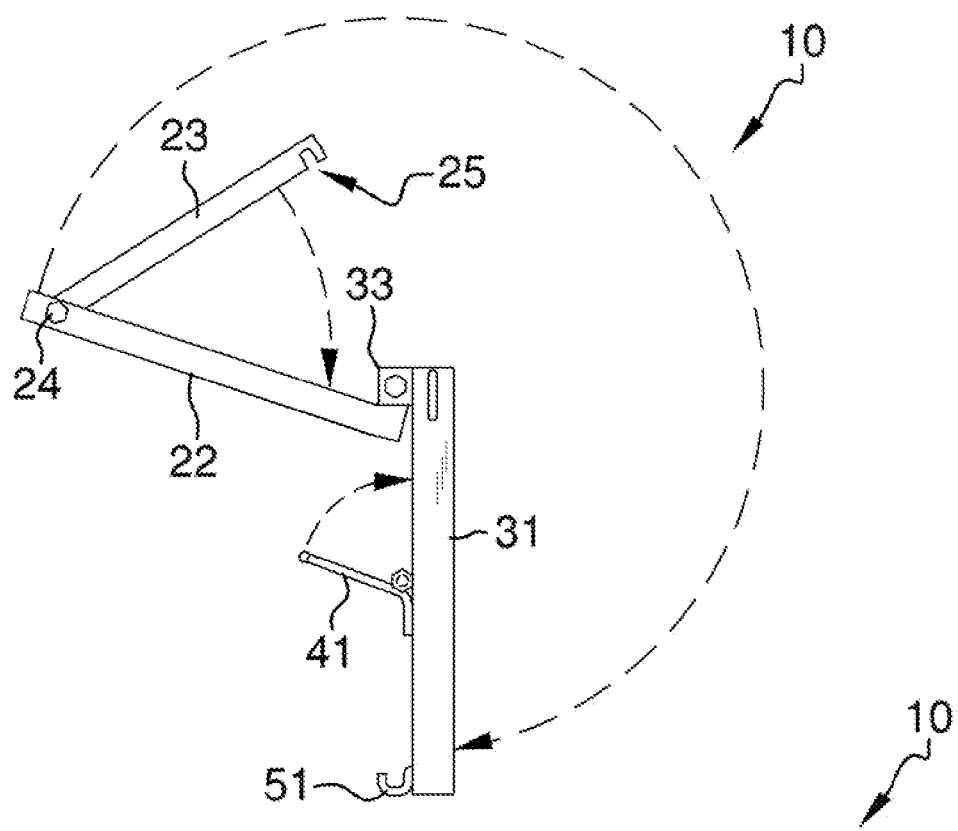
FIG. 3 illustrates a side view of the camp lantern tree stand with arrows depicting rotational movement of the camp lantern support arm rotating to a retracted position as well as one of the hooks rotating to a retracted position.

The first arm 22 is capable of rotating 270 degrees with respect to the base member 31 via the bracket 33. Referring to FIG. 3, the first arm 22 can rotate from a horizontal position (the camp lantern support arm 21 is fully extended) to a vertical position (the camp lantern support arm 21 is fully retracted behind the base member 31). It shall be noted that the fully retracted position requires the second arm 23 to be rotated with respect to the first arm 22, which is prior to rotation of the first arm 22 with respect to the base member 31.

The base member 31 is of U-shaped construction (see FIG. 5) such that the camp lantern support arm 21 can fully retract into an opening 34 formed between the base member 31 and the tree 61.

The plurality of hooks 41 attach to and pivot about a pivoting point 42. The plurality of hooks 41 can rotate up to a vertical position (see FIG. 4) or to a lowered position (see FIGS. 1-3). It shall be noted that each hook 41 can rotate individually with respect to the pivoting point 42.

The plurality of bottom hooks 51 are affixed to the base member 31 and do not rotate as with the hooks 41 mentioned above. It shall be noted that both the hooks 41 and the bottom hooks 51 adorn a front surface 31A of the base member 31. It shall be further noted that the hooks 41 and the bottom hooks 51 are useful in hanging items thereon, and may comprise cooking utensils and towels as depicted in FIG. 1.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A camp lantern tree stand comprising:
a base member from which an adjustable tree strap extends around a tree and secures said base member against said tree;
wherein a camp lantern support arm extends from said base member and has a notch for the support of a camp lantern thereon;
wherein a plurality of hooks adorn a front surface of the base member for hanging a plurality of items thereon;
wherein the camp lantern support arm further comprises a first arm connected to a second arm via a rotating point; wherein the first arm connects to the base member via a bracket located on the base member;
wherein the second arm can rotate a total of 180 degrees of rotation with respect to the first arm such that the second arm and the first arm are fully extended or fully retracted;
wherein the first arm is constructed of a U-shaped channel whereas the second arm is constructed of a single bar that is attached to the first arm via the pivoting point; wherein the second arm is stopped from over-rotating with respect to the first arm via the single bar and U-shaped construction.

2. The camp lantern tree stand as described in claim 1 wherein the adjustable tree strap includes a ratchet that can adjust the overall length of the adjustable tree strap in order to accommodate trees of differing diameters.

3. The camp lantern tree stand as described in claim 1 wherein the adjustable tree strap includes a hook on an end which is used to hook onto an eyelet located on the base member.

4. The camp lantern tree stand as described in claim 1 wherein the adjustable tree strap is made of a flexible material.

5. The camp lantern tree stand as described in claim 1 wherein the first arm is capable of rotating 270 degrees with respect to the base member via the bracket; the first arm can rotate from a horizontal position wherein the camp lantern support arm is fully extended to a vertical position wherein the camp lantern support arm is fully retracted behind the base member.

6. The camp lantern tree stand as described in claim 5 wherein the base member is of U-shaped construction such that the camp lantern support arm can fully retract into an opening formed between the base member and the tree.

7. The camp lantern tree stand as described in claim 1 wherein the plurality of hooks attach to and pivot about a pivoting point on the front surface of the base member; wherein the plurality of hooks can rotate up to a vertical position or to a lowered position.

8. The camp lantern tree stand as described in claim 7 wherein the hooks can each rotate individually with respect to the pivoting point.

9. The camp lantern tree stand as described in claim 1 wherein a plurality of bottom hooks are affixed to the front surface of the base member.

10. A camp lantern tree stand comprising:
a base member from which an adjustable tree strap extends around a tree and secures said base member against said tree;
wherein the adjustable tree strap includes a ratchet that can adjust the overall length of the adjustable tree strap in order to accommodate trees of differing diameters;
wherein the adjustable tree strap includes a hook on an end which is used to hook onto an eyelet located on the base member;
wherein a camp lantern support arm extends from said base member and has a notch for the support of a camp lantern thereon;
wherein a plurality of hooks adorn a front surface of the base member for hanging a plurality of items thereon;
wherein the camp lantern support arm further comprises a first arm connected to a second arm via a rotating point; wherein the first arm connects to the base member via a bracket located on the base member; wherein the second arm can rotate a total of 180 degrees of rotation with respect to the first arm such that the second arm and the first arm are fully extended or fully retracted; wherein the first arm is constructed of a U-shaped channel whereas the second arm is constructed of a single bar that is attached to the first arm via the pivoting point; wherein the second arm is stopped from over-rotating with respect to the first arm via the single bar and U-shaped construction; wherein the first arm is capable of rotating 270 degrees with respect to the base member via the bracket; the first arm can rotate from a horizontal position wherein the camp lantern support arm is fully extended to a vertical position wherein the camp lantern support arm is fully retracted behind the base member; wherein the base member is of U-shaped construction such that the camp lantern support arm can fully retract into an opening formed between the base member and the tree.

11. The camp lantern tree stand as described in claim 10 wherein the adjustable tree strap is made of a flexible material.

12. The camp lantern tree stand as described in claim 10 wherein the plurality of hooks attach to and pivot about a pivoting point on the front surface of the base member; wherein the plurality of hooks can rotate up to a vertical position or to a lowered position; wherein the hooks can each rotate individually with respect to the pivoting point; and wherein a plurality of bottom hooks are affixed to the front surface of the base member.

13. A camp lantern tree stand comprising:
a base member from which an adjustable tree strap extends around a tree and secures said base member against said tree;
wherein the adjustable tree strap includes a ratchet that can adjust the overall length of the adjustable tree strap in order to accommodate trees of differing diameters;
wherein the adjustable tree strap includes a hook on an end which is used to hook onto an eyelet located on the base member;
wherein a camp lantern support arm extends from said base member and has a notch for the support of a camp lantern thereon;
wherein the camp lantern support arm further comprises a first arm connected to a second arm via a rotating point; wherein the first arm connects to the base member via a bracket located on the base member; wherein the second arm can rotate a total of 180 degrees of rotation with respect to the first arm such that the second arm and the first arm are fully extended or fully retracted; wherein the first arm is constructed of a U-shaped channel whereas the second arm is constructed of a single bar that is attached to the first arm via the pivoting point; wherein the second arm is stopped from over-rotating with respect to the first arm via the single bar and U-shaped construction; wherein the first arm is capable of rotating 270 degrees with respect to the base member via the bracket; the first arm can rotate from a horizontal position wherein the camp lantern support arm is fully extended to a vertical position wherein the camp lantern support arm is fully retracted behind the base member; wherein the base member is of U-shaped construction such that the camp lantern support arm can fully retract into an opening formed between the base member and the tree;

wherein a plurality of hooks adorn a front surface of the base member for hanging a plurality of items thereon.

14. The camp lantern tree stand as described in claim 13 wherein the adjustable tree strap is made of a flexible material.

15. The camp lantern tree stand as described in claim 13 wherein the plurality of hooks attach to and pivot about a pivoting point on the front surface of the base member; wherein the plurality of hooks can rotate up to a vertical position or to a lowered position; wherein the hooks can each rotate individually with respect to the pivoting point; and wherein a plurality of bottom hooks are affixed to the front surface of the base member.

* * * * *